United States Patent [19]
Bramley

[11] Patent Number: 6,136,263
[45] Date of Patent: Oct. 24, 2000

[54] DROSS PRESS WITH ROCKING PRESS HEAD

[75] Inventor: Alan Bramley, Nottingham, United Kingdom

[73] Assignee: J. McIntrye Machinery Limited, United Kingdom

[21] Appl. No.: 09/297,495

[22] PCT Filed: Oct. 29, 1997

[86] PCT No.: PCT/GB97/02978

§ 371 Date: Jul. 6, 1999

§ 102(e) Date: Jul. 6, 1999

[87] PCT Pub. No.: WO98/20175

PCT Pub. Date: May 14, 1998

[30] Foreign Application Priority Data

Nov. 4, 1996 [GB] United Kingdom .................. 9623320

[51] Int. Cl.⁷ ..................................................... C22B 7/00
[52] U.S. Cl. ......................................... 266/205; 266/227
[58] Field of Search ..................................... 266/227, 205; 75/672, 414, 640, 655

[56] References Cited

U.S. PATENT DOCUMENTS

| 5,397,104 | 3/1995 | Roth | 266/227 |
| 5,667,957 | 9/1997 | Roth | 266/227 |
| 5,811,056 | 9/1998 | Bramley | 266/205 |
| 5,882,580 | 3/1999 | Pownall | 266/205 |
| 5,906,790 | 5/1999 | Bramley | 266/205 |

FOREIGN PATENT DOCUMENTS

WO 96/32513  10/1996  WIPO .

*Primary Examiner*—Scott Kastler
*Attorney, Agent, or Firm*—Reese Taylor

[57] ABSTRACT

A dross press including a press head and skim box and including a head system comprising pressing means for pressing the dross in said skim box, said press means including means for providing a rocking movement for said press head. Said means comprise two hydraulic rams spaced apart on diametrically opposite sides of the press head.

8 Claims, 2 Drawing Sheets

DROSS PRESS WITH ROCKING PRESS HEAD

The present invention relates to dross presses and more particularly to a dross head movement system.

Dross presses are used to press dross contained in a dross pot. The hot dross is extracted from a furnace and placed in the dross pot. The dross pot is then transferred to the dross press where the dross is pressed by a press head and the molten metal, usually aluminium, is collected in a sow mould positioned beneath the dross pot. The dross pot is provided with at least one drainage hole to allow the molten aluminium to flow into the sow mould.

A problem which arises with present press head and skim box systems is that the liquid aluminium becomes trapped in the dross. Many systems have been designed to increase the yield such as those described in U.S. Pat. Nos. 5,397,104 and 4,527,779.

It is an object of the present invention to provide a dross head movement system which increases the yield of metal from dross.

Although the dross can contain other metals, the normal use is for aluminium, and hereinafter the term aluminium will be used to cover all suitable metals which may be processed in a dross press.

According to the present invention there is provided a dross press including a press head and a skim box and including a head system comprising pressing means for pressing the dross in said skim box, said press means including means for providing a rocking movement for said press head in which the press means for providing rocking movement of the press head comprises a plurality of hydraulic rams spaced apart on the press head which each hydraulic ram is provided with control means enabling hydraulic pressure to be exerted by all rams to produce a uniform pressure on the press head. The control means is also operable to enable hydraulic pressure to be exerted on either one or the other ram to cause the head to rock from side to side.

Preferably the head is generally conical in shape with a substantially flat top.

The head can be cooled as described in our co-pending patent application Ser. No. WO96/32513.

Preferably on the top of the head a control stop is mounted for the hydraulic control system. The control stop preferably comprises a generally rectangular or inverted semi conical structure which co-operates with first and second limit switches as the head rocks. The limit switches are connected to appropriate control valves to control the flow of hydraulic fluid into each of the hydraulic rams.

In a further embodiment three or more hydraulic rams are provided on the head to enable the head to be rocked in several different directions.

Embodiments of the present invention will now be described, by way of example with reference to the accompanying drawings in which:

Figure 1:
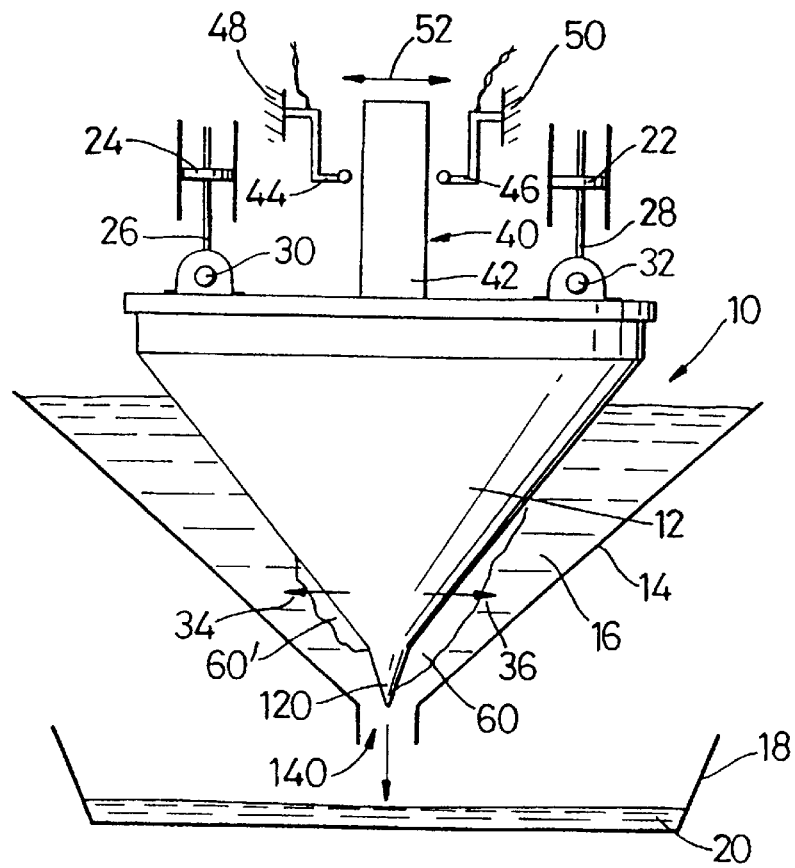
FIG. 1 shows in schematic cross-section elevation of a dross press in accordance with the present invention.
Figure 2:
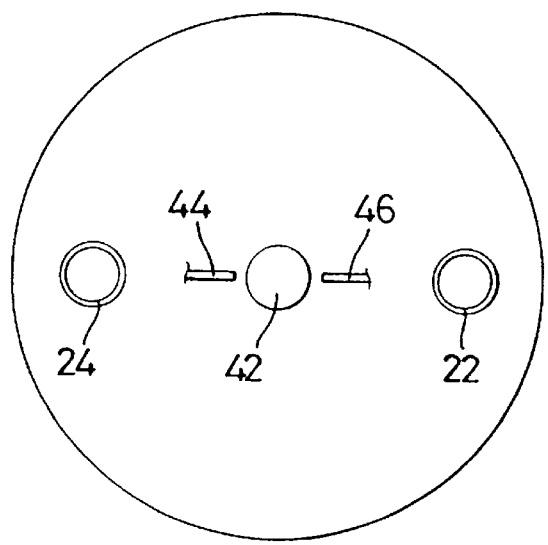
FIG. 2 shows schematically the dross press head of FIG. 1 in plan view.
Figure 3:
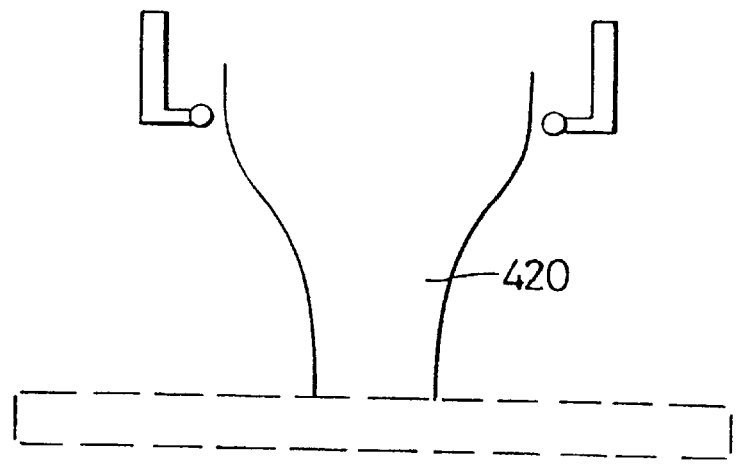
FIG. 3 shows an alternative guide stop member.

With reference now to FIGS. 1 and 2, the dross press 10 comprises a press head 12 and a skim box 14 for holding hot dross 16 skimmed from a furnace (not shown).

The drawing is not dimensionally accurate but shows the basic principle.

Once the hot dross has been loaded into the skim box, a certain quantity of aluminium 20 will drain naturally from the skim box into a sow mould 18.

In normal operation head 12 is pressed downwards into the dross and this pressure causes further aluminium to be squeezed from the dross. This may be done in a single pressing operation or using several strokes of a central hydraulic ram.

A problem which exists with smooth sided heads is that the dross becomes compressed but the pressure is even and further compression will not substantially extract any further aluminium.

In the present invention the head 12 is provided with two hydraulic rams 22 and 24 which are independently operable. The operating rods 26, 28 of each ram are connected to the top of head 12 by bearings 30,32 which act as hinges allowing the head 12 to move relatively in a rocking motion as indicated by arrows 34,36.

A control mechanism 40 is included to control the limit of the movement of the head. This control could take a number of forms but any control will require to be robust since the environment within the press is extremely hostile.

The control device comprises a rectangular plate 42 which could alternatively be a tube.

The plate 42 is rigidly mounted on top of the head 12 and therefore moves with the head.

On each side of the plate 42 limit switches 44,46 are positioned, the limit switches being mounted as shown at 48,50 to the cabinet. These limit switches are therefore fixed in position relative to the skim box 14. Electrical contact is made to each limit switch so that as the switch operates, the hydraulic pressure to each ram 22,24 is controlled.

The operation of the press is as follows. The skim box is filled to the correct level with dross and placed into the dross press. The doors of the dross press (see PCT Application No. GB96/00888) are closed and the pressing operation commences. The press head 12 descends under equal pressure applied to both rams 22,24 until either a geometric limit of travel is reached or (see FIG. 4) the ram pressure reaches a first limit indicating a first lower pressure applied to the dross.

At this stage hydraulic pressure to one of the rams, e.g. 24 is stopped and hydraulic pressure is applied only to the second ram 22. This causes the head 12 to move or rock towards the left-hand side as indicated by arrow 34.

This in turn will cause plate 42 to move as indicated by arrow 52 until it touches and then operates limit switch 48. Thus causes hydraulic pressure to ram 22 to cease to be applied and causes hydraulic pressure to be applied to ram 24, thereby moving head 12 in the direction of arrow 36 until plate 42 touches limit switch 44 and operates this switch which alternates the hydraulic pressure from ram 24 to ram 22. Thus, head 12 is rocked backwards and forwards as it descends.

When head 12 has descended into the dross until an upper hydraulic pressure limit has been reached then the hydraulic pressure on rams 22 and 24 (if required after a timed pause) is reversed and the head is lifted. The operation can then be recommenced in second, third, etc cycles.

The rocking movement of head 12 has a number of advantages. As the head 12 moves, for example, the direction of arrow 34, a cavity is created in the dross as shown at 60. This cavity enables molten aluminium trapped on the inside surface of the dross skull to drain downwards.

In a preferred embodiment the head 12 is provided with a tip or spike 120 which penetrates into outlet hole 140 of box 14. This enables the molten metal to drain down through cavity 60 and to drain out of hole 140 into sow mould 20.

Similarly as head 12 is moved in the direction of arrow 36, a second cavity 60' is created on the opposite side and this provides drainage on this side.

In addition, as the head moves, additional pressure is applied to the dross alternately on each side causing the dross to be further squeezed and thereby causing further release of aluminium.

Due to the relatively slow movement of head 12 the dross is not exposed to the air, the upper part of the head forming a seal for the dross, thereby preventing thermiting.

Since as part of the process the dross requires cooling, the head 12 may be provided with cooling means such as described in our co-pending patent application Ser. No. WO96/32513. Due to the smooth side design of the head the cooling will be very effective.

As indicated the downward movement of the head ceases when a hydraulic pressure limit is reached and the head is then raised to is commence a further compression cycle.

As shown diagrammatically in FIG. 2, the cylinders 22,24 are situated diametrically opposed on head 12 and the guide and limit switches 40 are situated centrally between the cylinders 22,24.

In an alternative design for the guide 42, a modified guide 420 is used which has a tapered shape. The shape can be modified to suit the shape of the skim box and head design.

In this modification the head will be moved much farther in the direction of arrows 34,36 when it is higher (i.e. less penetrating into skim box 14) and less when it is lower down.

Figure 4:
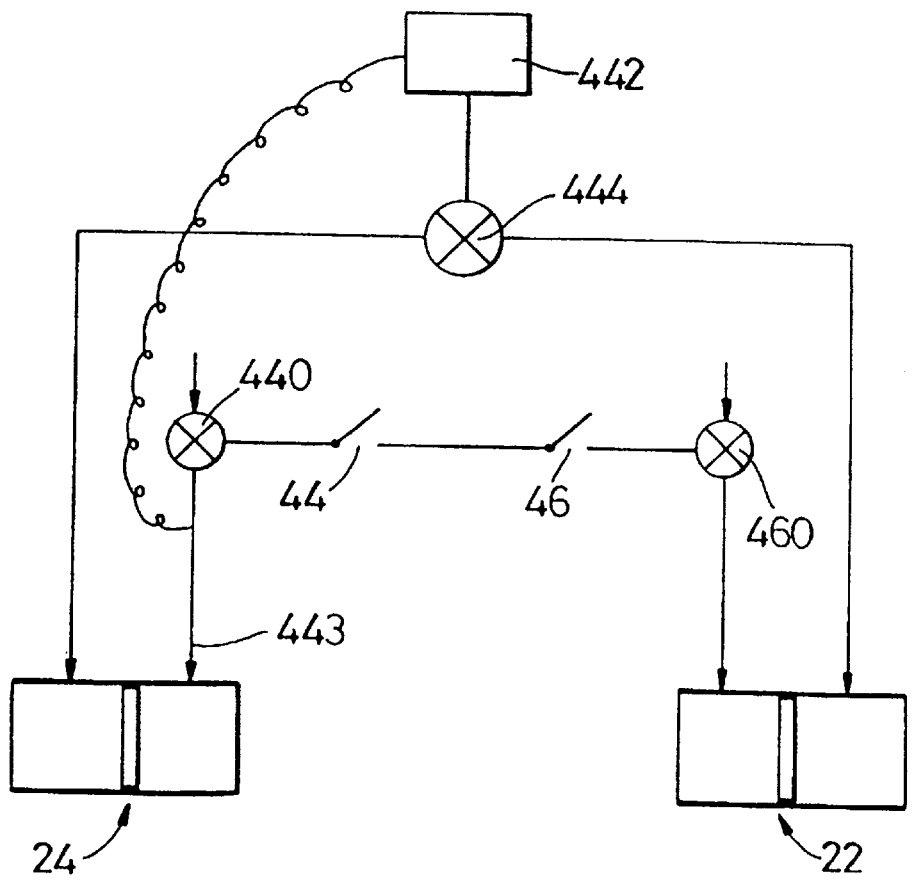
FIG. 4 shows diagrammatically the electrical and hydraulic control system.

A control system is shown schematically in FIG. 4. The hydraulic cylinders 22,24 and limit switches 44,46 are shown.

The limit switches 44,46 control valves 440,460 and therefore when actuated close the supply of the hydraulic pressure to the cylinders 22,24 respectively.

A pressure sensor 442 is provided which senses the hydraulic pressure on, for example, hydraulic line 443 and when this reaches a limit pressure the sensor 442 opens valve 444 to force the cylinders 22,24 back to their starting position at which the head 12 is in its uppermost position.

This forms a basic control system but it is possible to have overriding geometrically positioned limit switches to cause the head only to return part way after initial compression and a timing device to cause the head to return to an extreme uppermost position after the dross has been suitably processed and cooled.

What is claimed is:

1. A dross press including a press head and a skim box and including a head system comprising pressing means for pressing the dross in said skim box, said press means including means for providing a rocking movement for said press head in which the press means for providing rocking movement of the press head comprises a plurality of hydraulic rams spaced apart on the press head; and control means in communication with said hydraulic rams operable to enable hydraulic pressure to be selectively exerted on one or more rams to cause the head to rock from side to side within defined limits.

2. A dross press as claimed in claim 1 in which there are two hydraulic rams spaced apart on diametrically opposite sides of the press head.

3. A dross press as claimed in claim 1 in which the head is generally conical in shape with a substantially flat top.

4. A dross press as claimed in claim 3 in which the head is cooled.

5. A dross press including a press head and a skim box and including a head system comprising pressing means for pressing the dross in said skim box, said press means including means for providing a rocking movement for said press head in which the press means for providing rocking movement of the press head comprises a plurality of hydraulic rams spaced apart on the press head in which each hydraulic ram is provided with control means enabling hydraulic pressure to be exerted by all rams to produce a uniform pressure on the press head, the control means being also operable to enable hydraulic pressure to be exerted on one or more rams to cause the head to rock from side to side; wherein the head is generally conical in shape with a substantially flat top, said head being cooled; and a control stop for the hydraulic control system mounted on top of said head.

6. A dross press as claimed in claim 5 in which the control stop comprises a generally rectangular or inverted semi-comical structure which cooperates with the first and second limit switches as the head rocks.

7. A dross press as claimed in claim 6 in which the limit switches are connected to appropriate control valves to control the flow of hydraulic fluid into each of the hydraulic rams.

8. A dross press as claimed in claim 7 in which three or more hydraulic rams are provided on the head to enable the head to be rocked in several directions.

* * * * *